O. C. KNIPE.
BALL BEARING.
APPLICATION FILED OCT. 6, 1916.
1,233,583.
Patented July 17, 1917.
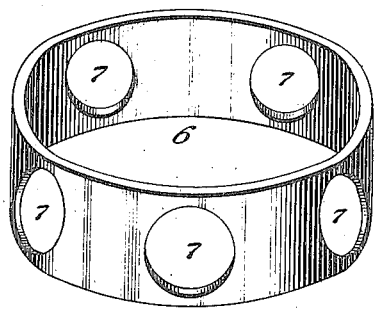
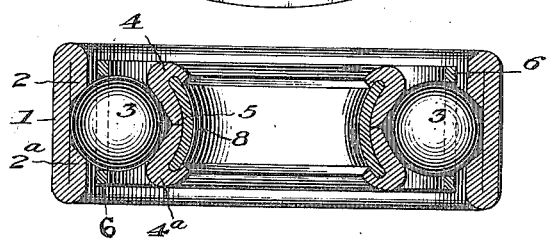
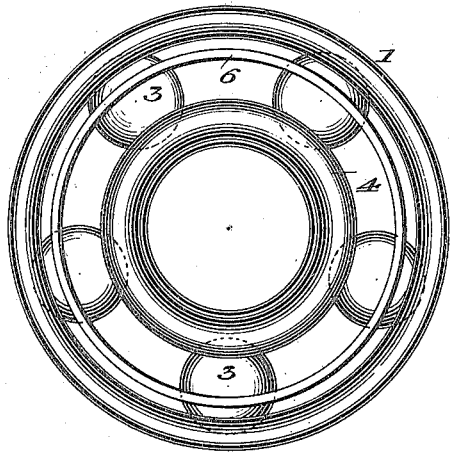
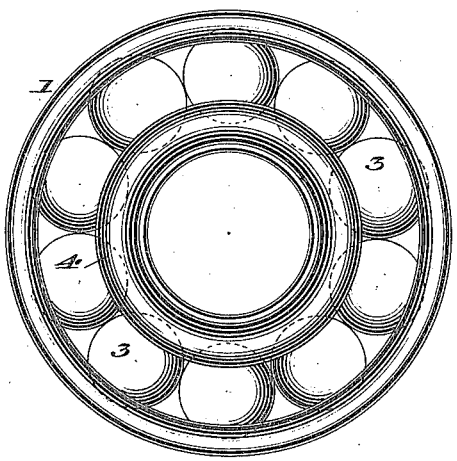
Inventor
Oliver C. Knipe
Witness
By
Attorney

UNITED STATES PATENT OFFICE.

OLIVER C. KNIPE, OF PALO ALTO, CALIFORNIA.

BALL-BEARING.

1,233,583.    Specification of Letters Patent.    Patented July 17, 1917.

Application filed October 6, 1916. Serial No. 124,160.

*To all whom it may concern:*

Be it known that I, OLIVER C. KNIPE, a citizen of the United States, residing in Palo Alto, in the county of Santa Clara, State of California, have invented certain new and useful Improvements in Ball-Bearings, of which the following is a specification.

In a prior Patent No. 1,134,463, dated April 6, 1915, I described a ball bearing comprising two relatively movable members having coöperating raceways or grooves for a series of spherical balls, the inner one of which could be inserted within the outer one and shifted to introduce the balls, and an annular ball-spacer then inserted with a flange overhanging and locking the two members together. My present invention relates to an improvement on this construction in permitting the balls to positively interlock with the two members, to greatly cheapen the construction of the parts, and to increase the ease of assembling the bearing. To accomplish this result the inner and outer members are formed of sheet steel reinforced tubes preferably, the inner member being divided on a median plane, the reinforcement being integral with the body of each part. The object of this construction is to increase the cheapness of manufacture and at the same time stiffen the structure and prevent any distortion of the steel from the heat treatment to which it is subjected in the hardening process. The improvement is applicable to the type in which a full circle of balls are used, as well as to the type in which a spacer is used, with a small number of balls. In this construction the balls themselves become a positive and unyielding interlock with minimum clearance of the rolling parts for the two members. My invention therefore, consists in providing a tubular member with integral infolded reinforcements to form a guide groove or raceway for the balls; it also consists in forming the inner member of a sectional cone forming a groove or raceway for the balls, the parts of which are made a rigid unit by an expanded metal liner cupped around the convex contour of the sections; it consists also of such a type of ball bearing with a tubular ball-spacer separating and holding in mutually equidistant relation a plurality of balls.

The several features of novelty will be hereinafter more fully described in the specification, and will be definitely indicated in the claims.

In the accompanying drawing, Figure 1 is a face view showing a ball bearing having a ball-spacer embodying my invention; Fig. 2 is a sectional view of Fig. 1; Fig. 3 is a perspective view of the ball-spacer used in Figs. 1 and 2; and Fig. 4 is a face view of a type of ball-bearing having a full circle of balls.

I prepare by suitable dies a cylindrical outer member 1 with an internal integral reinforce 2, 2$^a$ at each end, in which the sheet Bessemer steel is folded on itself with the edges of the fold sheared to a 45° angle. This reinforce acts as a stiffener by forming an annular internal bead, the edges of which within the cylinder are brought into true circular parallelism, leaving a depression or groove which forms a raceway or track to guide the steel balls. The inner member 4, 4$^a$ is formed of two piece of sheet steel with an integral internal reinforce similar to the outer member, and on its outside is conically dished in each of its parts to form when the two parts are superposed axially a raceway for the balls to coöperate with the raceway of the outer member. This construction permits me to manufacture the several parts with minimum expense, to afford a structure with a symmetrical reinforcement which will not admit of any distortion in the heat treatment to which the soft and worked steel is subjected during the hardening process which generally follows in tubular shells made of sheet steel, due to the strains produced by chilling, which warp the metal and destroy its true cylindrical conformation and alinement. I make the spacer also of thin sheet metal stock. It consists of a stamped shell 6 with a plurality of ball-holes of less diameter than the balls as shown at 7. In assembling the parts in the type where a full circle of balls 3 are required the balls are introduced into the groove of the outer member with the lower section of the inner member in place; then the upper section of the inner member is placed over the balls and a cylindrical steel tube 8 is inserted within the assembled inner members and an expanding tool applied to expand the metal to the concave form shown in Fig. 2, by which the soft metal is driven into the grooves under the edges of the reinforce. Thus the inner and outer members are positively interlocked by the balls, and the divided inner member is made a strong unit. Where a less than full circle of balls is used the spacer holes 7 are coated with a stiff grease, for which ordinary axle-grease may be used, and the balls are pushed into the holes as far as they will go and then introduced into the outer member while the lower section of the inner member is in a central position; the outer section of the inner member is then superposed on its companion section and the tubular liner 8 in its unexpanded form is applied; an expanding tool is then inserted and the liner expanded until it fills the convex space and adjoining edge-grooves on the interior of the assembled parts of the inner member. This operation makes a particularly strong mechanical interlock of the two parts, since in order to yield to the slightest extent the metal must stretch and shift outward in the corner of the grooves where it is locked with the greatest strength. I prefer to make the concavity of the two parts of the divided inner member conical and of the same shape as shown at 4, 4ª, Fig. 2, as this cheapens the manufacture, and also makes the ball-track walls engage the balls on a line 5 where the joint does not engage the spherical outline of the balls.

Having thus described my invention, what I claim as new and desire to secure by Letters-Patent is:

1. A ball-bearing comprising a tube of sheet steel having a guide groove or raceway, the edges of which are formed of reinforcing bends approaching each other, the raceway parts being hardened.

2. A ball-bearing comprising a tube of sheet steel having a guide-groove or ball-track, the edges of which are formed of reinforcing bends approaching each other, the reinforcing edges of the bends being beveled in inclined relation to the axis.

3. A ball-bearing comprising an annular member with integral reinforces approaching each other to form a ball-track, a coöperating divided grooved member, a series of balls equidistant from each other in a ball-raceway between the two members, and a perforated spacer nesting the balls and maintaining them in constant equidistant relation.

4. A ball bearing comprising an annular member with integral reinforce bends parallel to the axis, a coöperating divided grooved member, a plurality of balls interlocking the two members, and a concave-convex metallic, hollow liner making a strong unit of the divided member.

OLIVER C. KNIPE.